United States Patent [19]

Jantzen et al.

[11] 3,880,382

[45] Apr. 29, 1975

[54] TAPE EXTRACTOR FOR MAGNETIC TAPE CARTRIDGE SYSTEM

[75] Inventors: Johannes K. Jantzen, Mount View; Eric K. Maxon, Los Gatos; Andrew W. Hinman, Sunnyvale, all of Calif.

[73] Assignee: International Video Corporation, Sunnyvale, Calif.

[22] Filed: Oct. 26, 1972

[21] Appl. No.: 301,052

[52] U.S. Cl. .................... 242/195
[51] Int. Cl. .................... G11b 15/66
[58] Field of Search .................... 242/195, 205, 210; 352/157, 158; 226/91, 92

[56] References Cited

UNITED STATES PATENTS

| | | | |
|---|---|---|---|
| 3,337,146 | 8/1967 | Miyauchi et al. | 242/208 |
| 3,604,657 | 9/1971 | Igarashi | 242/195 |
| 3,724,777 | 4/1973 | Martin et al. | 242/195 |

FOREIGN PATENTS OR APPLICATIONS

| | | | |
|---|---|---|---|
| 918,387 | 2/1963 | United Kingdom | 352/158 |

*Primary Examiner*—George F. Mautz
*Attorney, Agent, or Firm*—Limbach, Limbach & Sutton

[57] ABSTRACT

A tape extractor for automatically extracting a magnetic recording tape from a tape reel cartridge; the extractor has a retractable coiled metal or plastic band with a hook at its distal end which enters a single reel magnetic tape cartridge and hooks into the leader of a magnetic tape and withdraws the tape leader to a point at which the leader is engaged by a drive capstan and pinch roller and is automatically withdrawn from the extractor hook and fed through the recorder.

8 Claims, 5 Drawing Figures

TAPE EXTRACTOR FOR MAGNETIC TAPE CARTRIDGE SYSTEM

BACKGROUND OF THE INVENTION

This invention relates generally to a tape transport system, and in particular to a device for extracting the end of a tape from a single reel cartridge. In a single reel cartridge system it has previously been the practice to drive a tape leader from the cartridge by a puck or cartridge flanges.

It is desirable to create a device that will extract a tape which has simply been wound up into the cartridge. In this manner the use of a clutch or brake to stop the tape reel when the end of the tape has reached the cartridge can be avoided.

On an electronic command signal, the tape extractor of the present invention unreels a coiled stiff band which enters an opening in a tape reel cartridge. The tape reel in the cartridge is maintained in an active rotating low speed rewind condition until a hook on the extractor band engages a slot in a flexible but stiff leader at the end of a magnetic tape wound on the reel. Once caught, the hooked tape leader, by action of the rotating reel, further extracts the band and trips a switch which stops the active rotation of the tape reel and initiates retraction of the extractor band. As the band is retracted, the tape leader is drawn out of the cartridge and guided to a drive capstan and pinch roller where it is automatically threaded through a tape path to a take-up reel. The drive capstan is operated to transport the tape at a faster rate than the rate of retraction by the retractor. In this manner, the tape is disengaged or unhooked from the extractor band, the extractor band is allowed to fully retract, and the tape is permitted to continue on its path.

The tape extractor of this invention is preferably used in combination with other components for the automatic selfthreading of magnetic tape in a recording machine.

DESCRIPTION OF THE PREFERRED EMBODIMENT

Figures 1, 2:
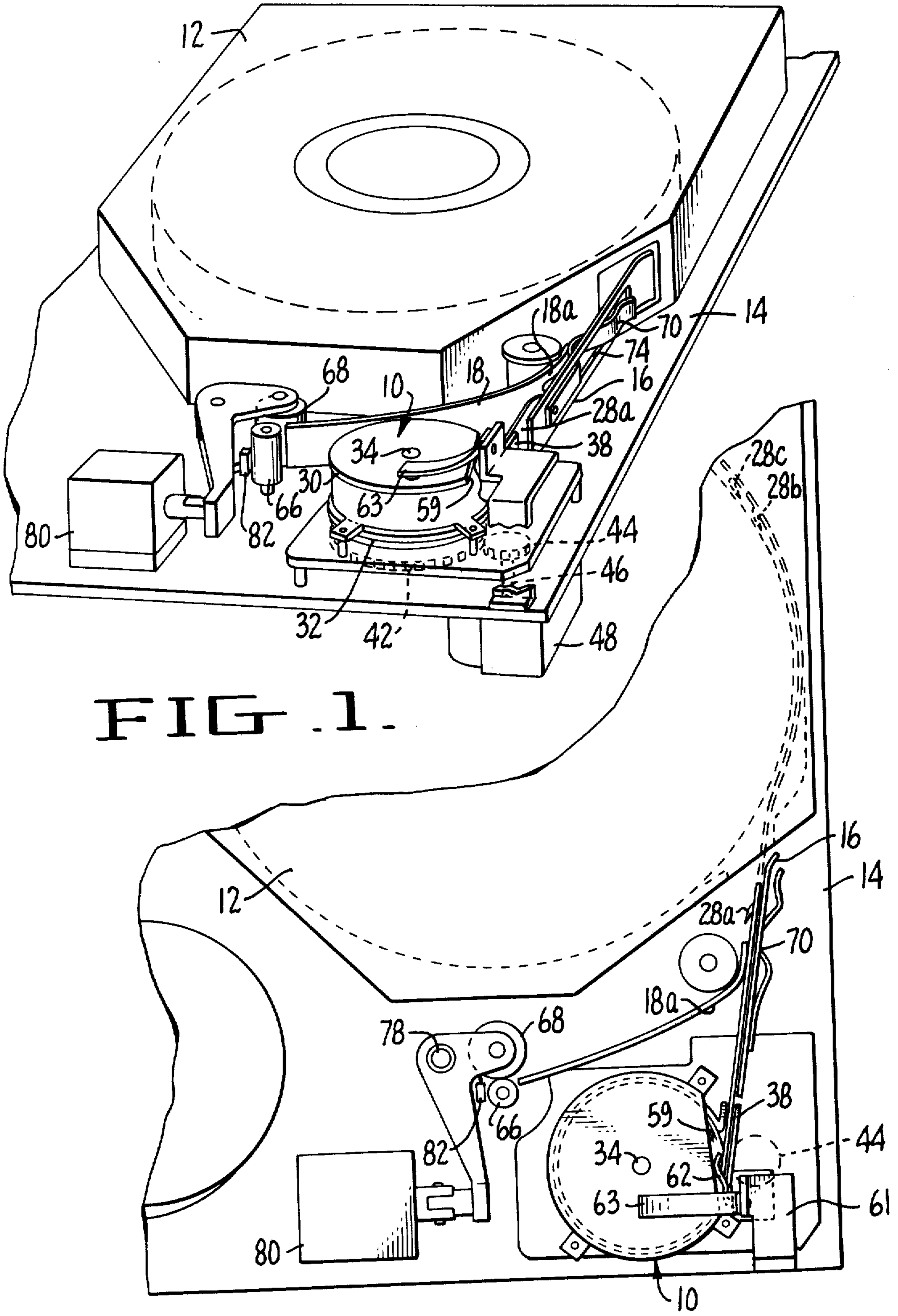
FIG. 1 is a perspective view of the extractor mechanism and a tape cartridge on a portion of a tape deck.
FIG. 2 is a plan view, partially fragmented, of the components shown in FIG. 1.

Referring to the perspective view of FIG. 1, an extractor mechanism 10 is shown in combination with a magnetic tape cartridge 12 on a portion of a recording machine deck 14. The extractor mechanism 10 and cooperating tape guides 16 and 18 operate to withdraw a magnetic tape 22 that is contained on a tape reel 24 within the cartridge 12, as shown in the fragmentary portion of the cartridge in FIG. 2.

Figure 3:
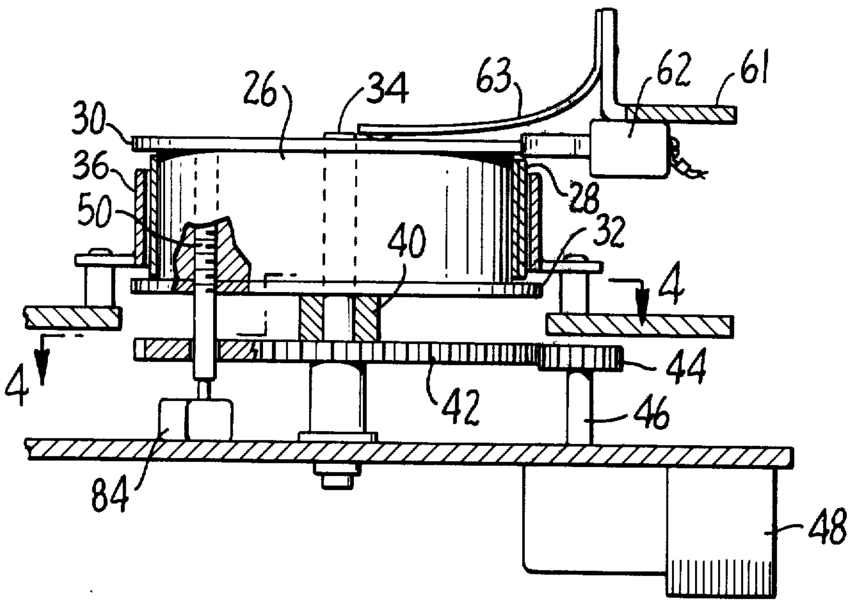
FIG. 3 is a sectional view of the extractor mechanism taken on the line 3—3 in FIG. 2.

The extractor mechanism 10 comprises a central drum 26, shown in FIG. 3, on which a polyester band 28 is wrapped. The band is retained on the drum by two flanges 30 and 32 mounted, respectively on the top and bottom of the drum. The flanged drum is pivotally mounted on a spindle 34 and free to rotate thereon. The band is secured at one end to the drum (not shown) and retained around the drum by a retainer ring 36 which has an exit passage 38 that permits the end of the band 28 to extend therethrough. Below the bottom flange 32 and separated therefrom by a low friction washer 40, shown in FIG. 3, is a drive gear 42. The drive gear 42 is connected to a motor gear 44 on the drive shaft 46 of a small reversible d.c. motor 48.

Figure 4:
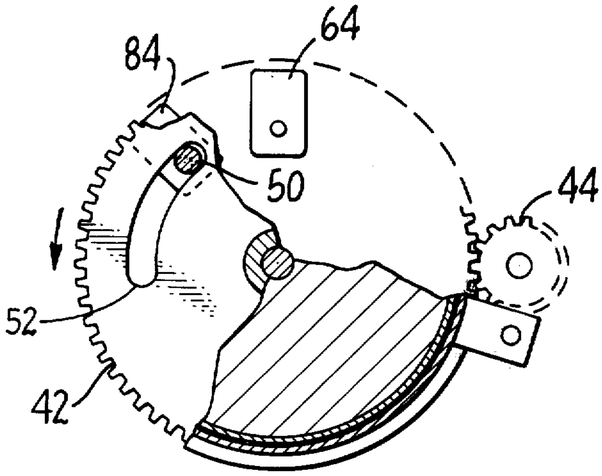
FIG. 4 is a fragmentary plan view of the extractor mechanism of FIG. 3.

With reference to the elevational section of the extractor mechanism 10 of FIG. 3, the drum 26 is shown operably connected to the drive gear 42, but shown in FIG. 4, is connected to the gear through a slot 52. The arrangement permits a limited movement of the drum without a corresponding movement of the drive gear.

Figure 5:
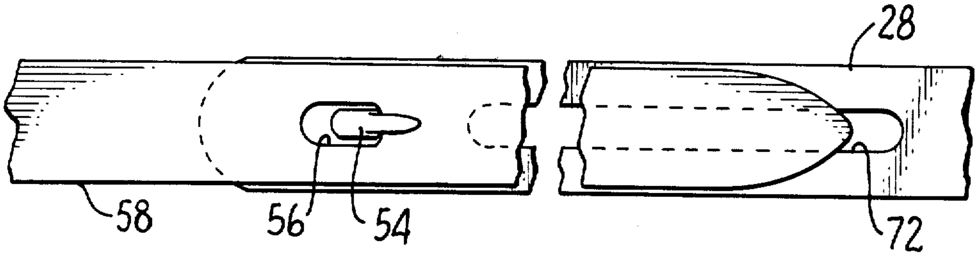
FIG. 5 is a fragmented elevational view of the hooking mechanism.

With reference to the plan view of FIG. 2, the path of the tape from the tape reel and the path of the band from the extractor mechanism can be described. Normally, the end of the extractor band is in position **28*a* shown in FIG. 2. However, when a tape cartridge is inserted on the tape deck and operation commenced, the d.c. motor connected to the drive gear of the extractor mechanism activates and unwinds the extractor band such that it enters the tape cartridge. The end of the band is ultimately driven by the motor to position 28*b* shown in phantom in FIG. 2. Concurrently with the operation of the drive motor, the tape reel is slowly rotated in a counterclockwise manner by appropriate transport mechanics. As the reel rotates, a hook 54 at the end of the extractor band 28 engages a slot 56 in a stiff polyester leader 58 connected to the magnetic tape 22 in the manner illustrated in FIG. 5. The slot 56 in the polyester leader is displaced approximately 6 inches from the end of the tape to permit the leader to be guided to a drive capstan 66 before the extractor band is fully retracted. When the end of the extractor band is driven by the motor 48 to the position 28*b* shown in phantom in FIG. 2, a flat 59 on the top flange 30 activates switch 62 mounted on bracket 61 to turn the motor off. In this position the flat 59 trips the switch 62 which by appropriate circuitry stops the further extension of the extractor band 28. During this sequence, the pin 50 is maintained against the drive side of the slot 52 by a hold back friction pad 63 also mounted on bracket 61**.

Once hooked, however, the tape leader 58 on the rotating tape reel 24 causes further withdrawal of the band 28 from the extractor mechanism until the end of the tape band is in the ultimate position **28*c* shown in phantom in FIG. 2. This additional distance of band withdrawal is defined and limited by the length of the slot in the drive gear 42 shown in FIG. 4. In this manner the drive gear remains stationary and the extractor drum is advanced by the pull of the tape reel until the pin is restricted by the opposite side of the slot. This radial movement is sufficient to move the pin to switch 64. When switch 64 is tripped by the pin 50, appropriate circuitry causes the reversal of the motor 48**, the retraction of the extractor band and stops the rotation of the tape reel.

The tape leader, hooked to the extractor band, is withdrawn from the cartridge and guided along tape guide 18 to a drive capstan 66, and a solenoid operated pinch roller 68. In order to divert the tape leader to the tape guide 18, a deformed leaf spring 70 mounted on guide 16 projects through a slot 72 shown in FIG. 5 in the extractor band and is so oriented to cause the end of the tape leader 58 to assume a path along the guide 18. In this manner the extractor band lies essentially flat against guide 16 and the withdrawn tape leader is directed along the guide 18 by the leaf spring 70. The leaf spring 70 is attached at one end to the guide and be deformation of the spring protrudes through a slot 74 in the guide 16 to interfere with a normal guide path adjacent to the guide in the manner shown in FIG. 1. The leaf spring is of such low spring force that when the end of the extractor band is extended outwardly from the extractor mechanism the spring is easily forced out of the way permitting the band to extend into the cartridge arranged on the tape deck. Once the end of the extractor band passes the leaf spring and the slot 72 in the band is oriented adjacent the leaf spring, the sspring is oriented adjacent the leaf spring, the spring is positioned to divert the end of the extracted tape leader.

As noted hereinbefore, the hook 54 on the extractor band 28 engages the tape leader 58 in a slot 56 substantially distant from the end of the tape leader. In this manner the end of the tape leader is enabled to engage the drive capstan before the end of the extractor band passes the bifurcated end portion 18a of the tape guide 18. The end portion of the guide 18 is bifurcated merely to accomodate the leaf spring to insure proper diversion of the tape leader.

The pinch roller 68 is preliminarily displaced from the drive capstan 66 and is supported on an arm 76 pivoted on pin 78. The arm is attached at its end to a solenoid 80 which is activated when the end of the tape leader trips a switch 82 after the end of the tape leader passes between the drive capstan 66 and the displaced pinch roller 68. When the switch 82 is tripped the solenoid 80 is activated and the pinch roller 68 is moved against the drive capstan thereby transporting the tape leader and connected magnetic tape 22.

The speed of the drive capstan is established to transport the magnetic tape 22 at a speed greater than the retraction speed of the extractor band. For example, in the preferred embodiment the tape is transported by the drive capstan at 7 i.p.s. and the extractor band is retracted at 5 i.p.s. In this manner the tape leader is disengaged from the hook 54 at the end of the extractor band. The extractor band continues retracting until the pin 50 protruding from the extractor drum 26 engages a third switch 84 in the extractor mechanism which stops the operation of the drive motor 48. The tape leader and connected tape continue on the tape path on the tape deck under transport by the drive capstan 66.

We claim:

1. An automatic tape extractor for extracting a tape from within a partially enclosed tape reel, the tape having an attached tape leader with a slot near its distal end, the extractor comprising:

a. an elongated band having a hook at its distal end;

b. first drive means, including a reversible electric motor, operably connected to said elongated band for extending and retracting the end of said band;

c. second drive means operably connectable to a tape reel for rotating a connected tape reel in at least a windup direction;

d. guide means for guiding said band into the periphery of a tape reel connected to said second drive means; and e. first activating means for activating said first drive means and extending said band along said guide means.

2. The tape extractor of claim 1 further comprising detection means for detecting an engagement of the hook of said band with a slot on a tape leader attached to a tape in a partially encloses tape reel connected to said second drive means and rotated in a windup direction, when said band is extended into the periphery of the tape reel.

3. The tape extractor of claim 2 further comprising means responsive to said detection means and operably connected to said second drive means for stopping rotation of a connected tape reel.

4. The tape extractor of claim 3 further comprising means responsive to said detection means for reversing said first drive means to retract said band and extract an engaged tape leader and tape.

5. The tape extractor of claim 4 further comprising means for disengaging an extracted tape leader from said band.

6. The tape extractor of claim 5 wherein said first drive means comprises a flanged drum on which said band is wound said drum being connected to a concentrically arranged gear by a pin and elongated slot connection, and said gear being operably connected to said reversible drive motor.

7. The tape extractor of claim 6 wherein said detection means comprises a first switching means and a second switching means so constructed and arranged that said first switching means stops the extension of the band when extended a predetermined distance, and said second switching means reverses the drive motor of said first drive means and disengages said second drive means when said band has engaged a tape leader and has been further extracted a predetermined distance by said second drive means through interaction of said pin and slot connection.

8. The tape extractor of claim 7 wherein said means for disengaging an extracted tape leader from said band comprises selective guide means to divert the end of an extracted tape leader from said band and tape transport means for engaging the end of a tape leader and transporting an engaged tape leader at a speed greater than the speed of said first drive means retracting said band.

* * * * *